INVENTORS
JIMMY H. STANTON
RICHARD L. EVERY
RALPH LEROY GRIMSLEY
BY
ATTORNEY

United States Patent Office

3,413,086
Patented Nov. 26, 1968

3,413,086
CONVERSION OF POTASSIUM CHLORIDE TO POTASSIUM SULFATE
Richard L. Every, Ralph Leroy Grimsley, and Jimmy H. Stanton, Ponca City, Okla., assignors to Continental Oil Company, Ponca City, Okla., a corporation of Delaware
Filed Feb. 27, 1967, Ser. No. 618,709
8 Claims. (Cl. 23—121)

ABSTRACT OF THE DISCLOSURE

Sulfur dioxide, water and an amine are reacted in an alcohol diluent to form the amine hydrogen sulfite, this product is oxidized and the resulting amine hydrogen sulfate is then reacted with potassium chloride in water diluent to precipitate potassium sulfate and form amine hydrogen chloride which is converted back to the original amine by thermal decomposition and recycled to the reaction zone.

FIELD OF INVENTION

This invention relates to converting potassium chloride to potassium sulfate and is particularly useful in the fertilizer field. In a more limited aspect, this invention relates to a method of preparing potoassium sulfate from sulfur dioxide containing gases, water, oxygen and potassium chloride.

BACKGROUND

Potassium is a highly desirable ingredient in fertilizers. Much of the potassium recovered occurs in the natural state as potassium chloride and many fertilizer compositions do use the potassium in this form. However, plants generally have a low tolerance for the chlorine ion and several states have laws restricting the application of potassium chloride to the soil. In recent years, it has been recognized that sulfur is also a desirable element for proper plant development; therefore, potassium as the sulfate is highly desirable. We have now found a relatively simple and inexpensive method of converting potassium chloride to potassium sulfate.

SUMMARY OF INVENTION

In its broadest aspect, our invention comprises reacting an amine hydrogen sulfate with potassium chloride in an aqueous solution to precipitate potassium sulfate and form a solution of the amine hydrogen chloride and recovering the potassium sulfate precipitate from mother liquor.

In a more limited aspect, our invention comprises reacting sulfur dioxide, water and an amine in an alcohol diluent to form the amine hydrogen sulfite, oxidizing the sulfite to the sulfate, separating the amine hydrogen sulfate from the alcohol which is recycled to the first stage and utilizing the amine hydrogen sulfate for reaction with the potassium chloride according to the broad concept of this invention and regenerating the amine from the amine hydrogen chloride to recycle said amine to the initial reaction step. Thus, in this more limited aspect, a complete integrated system is provided.

DRAWINGS

Figure 1:
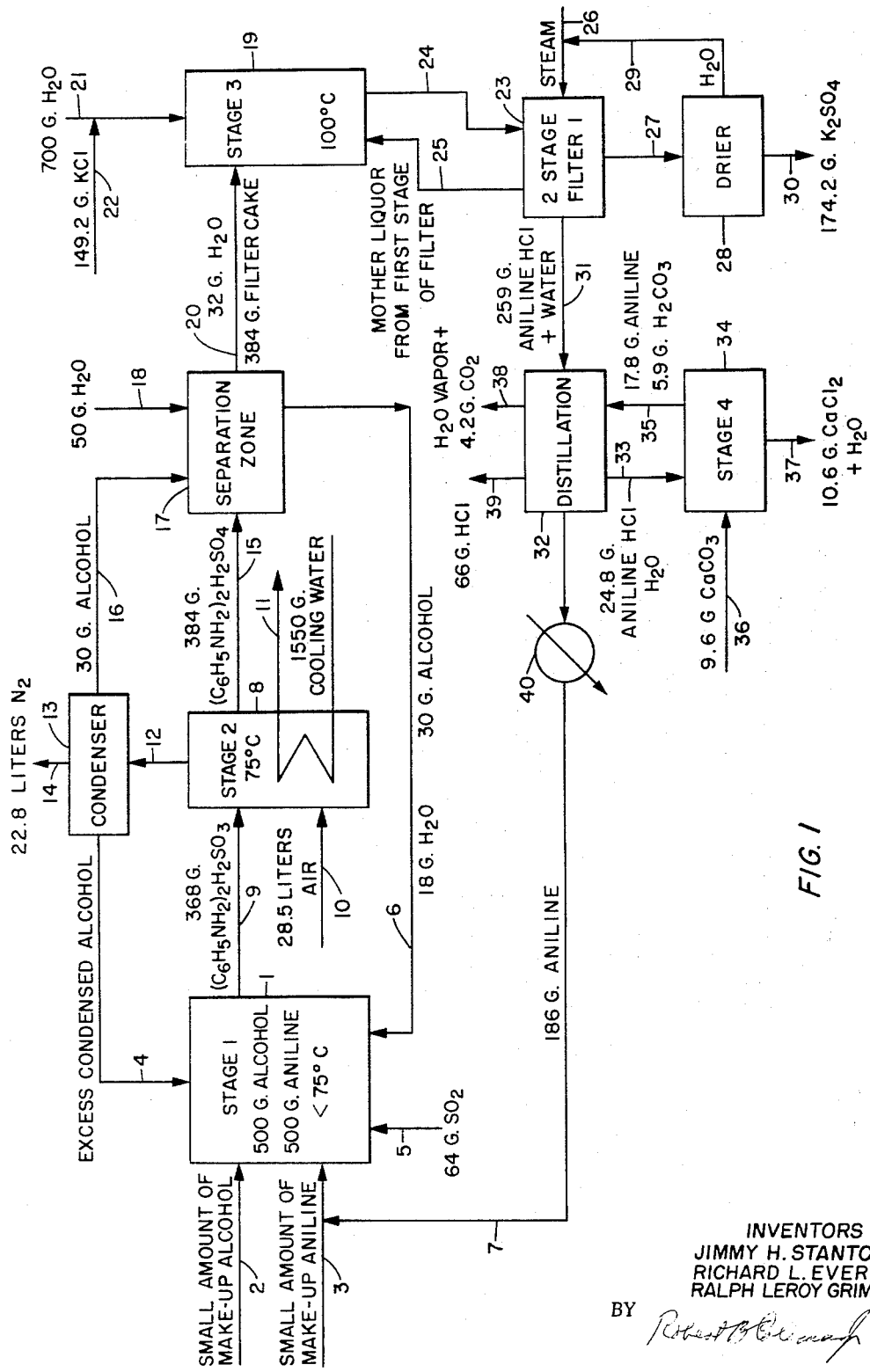
Figure 2:
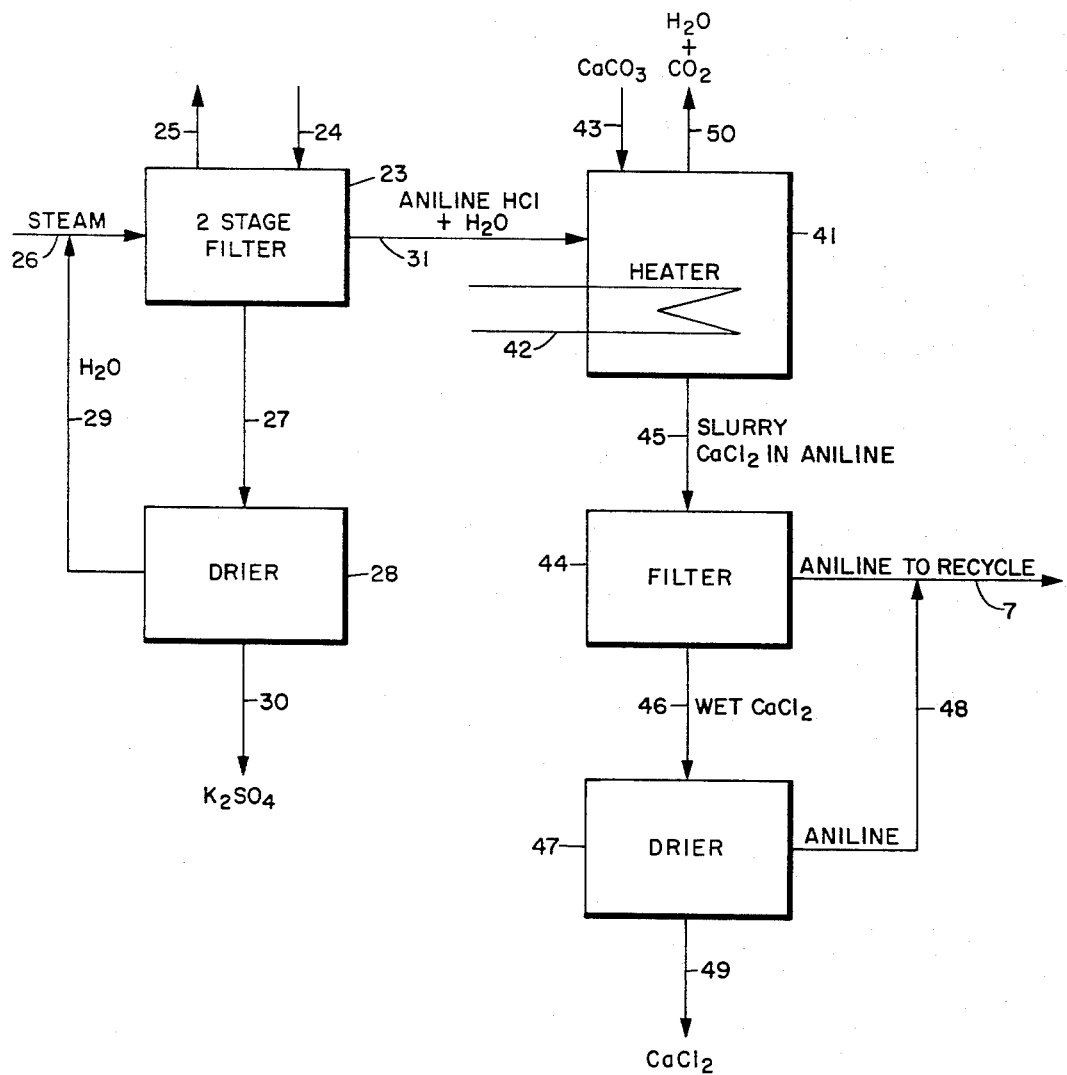

FIGURE 1 is a block flow diagram with material balance for a preferred embodiment of our invention, and FIGURE 2 shows in block flow diagram an alternate method of recovery of the amine from the amine hydrogen chloride.

DETAILED DESCRIPTION

As has been indicated, our invention broadly comprises reacting an amine hydrogen sulfate with potassium chloride in an aqueous solution thereby forming the amine hydrogen chloride in solution and precipitating potassium sulfate and recovering the potassium sulfate. However, the amine hydrogen chloride solution is of little value, therefore, we also provide a method of recovering the amine which can be returned for preparing the amine hydrogen sulfate. Further, since we desire a complete unit, we also show a means for providing a method of forming the amine hydrogen sulfate thus providing a complete cycle. However, it should be pointed out that in the broad concept of the invention, the amine hydrogen sulfate can be prepared by any method known to the art. In U.S. 2,970,039, Vian-Ortuno, patented Jan. 31, 1961, and in the copending application of Grimsley and Every, having Ser. No. 618,708, filed on even date herewith are described methods for forming the amine hydrogen sulfate which is later reacted with ammonia to form ammonium sulfate. In both of those methods, the amine hydrogen sulfate can be recovered by crystallization or distillation and be used in the process of this invention.

We use the term "amine" in its broadest sense and intend to include aliphatic amines, aromatic amines, olefinic amines, heterocyclic nitrogen compounds and the like. Thus, we include alkylamines, alkanol amines, pyridines, piperidines, lutidines, toluidines, diphenyl amines, quinolines and the like. Representatives of such amines include, but are not limited thereto, aniline, toluidine, quinoline, 3-butyl pyridine, pyridine, lutidine, ethanolamine, diphenylamine, n-butylamine, 1-butylpiperidine, cyclohexylamine, n-diaminopentane, diethylamine, dimethylamine, 1,2-dimethyl-piperidine, 1,2-dimethyl-tetrahydropyridine, ethylamine, 1-ethylpiperidine, iso-amylamine, isobutylamine, iso-propylamine, methylamine, piperidine, propylamine, propylpiperidine, quinine, triethylamine, trimethylamine, derivatives of these and the like. As will become obvious later, we prefer an amine which the hydrogen sulfate reaction product is non-soluble in alcohol and for that reason, we prefer the aromatic amines and particularly aniline.

We also prefer to prepare the amine hydrogen sulfate in alcohol solution since the preferred amine hydrogen sulfates are insoluble in these alcohols and can be readily recovered by filtration. The alcohol is preferably one of 1–6 carbon atoms and preferably an aliphatic alcohol which can be primary, secondary or tertiary. More specifically, we prefer such an aliphatic primary alcohol of not more than four carbon atoms such as methanol, ethanol, propanol, isopropanol, butanol, and isobutanol and particularly prefer ethanol because of its general availability. However, alcohols such as secondary butanol, tertiary hexanol, pentanol, n-hexanol, isohexanol and the like are operable, the only requirement being that the alcohol be liquid and a solvent for the amine.

We also prefer to prepare the amine hydrogen sulfate by reacting the amine with a stoichiometric amount of sulfur dioxide and water in the alcohol solution of the amine. The sulfur dioxide can be a pure gas but will most generally be gases from chemical or metallurgical operations, or such as are obtained by roasting sulfides.

To illustrate the invention, we will use aniline as our amine, sulfur dioxide, gas, air, ethanol and KCl. The following reactions are involved:

(1) $2\phi NH_2(\text{aniline}) + SO_2 + H_2O \xrightarrow{\text{ethanol}} (\phi NH_2)_2 \cdot H_2SO_3$ (2) $(\phi NH_2)_2 \cdot H_2SO_3 + \text{air} (N_2 + O_2) \xrightarrow{\text{ethanol}} (\phi NH_2)_2 \cdot H_2SO_4 + N_2$ (3) $(\phi NH_2)_2 \cdot H_2SO_4 + 2KCl \xrightarrow{H_2O} 2\phi NH_2 \cdot HCl + K_2SO_4$ (4) $2\phi NH_2 \cdot HCl + CaCO_3 \longrightarrow CaCl_2 + 2\phi NH_2 + H_2CO_3$ Referring now to the drawings and particularly to FIGURE 1, aniline is reacted with sulfur dioxide and water in ethanol solution in zone 1 according to Equation 1. Makeup alcohol is added to zone 1 via conduit 2, recycle aniline and makeup aniline are added to zone 1 via conduit 3, recycle alcohol is added via conduit 4, sulfur dioxide is supplied via conduit 5 and water alcohol is added via conduit 6. As shown on the drawing, a material balance for this particular system is shown. In this example we can assume the effluent from the condensers is cooled to about 60° C. and since the reaction in stage 1 is exothermic, the temperature will be between 70 and 75° C. The effluent aniline hydrogen sulfite passes to reaction zone 8 via conduit 9 where it is contacted with air from conduit 10. This zone is provided with cooler 11 to keep the temperature at about 75° C. Excess alcohol, nitrogen and inerts pass overhead via conduit 12 to condenser 13 where the alcohol is separated from the gaseous nitrogen and inerts. These gaseous materials are vented via conduit 14. The bulk of the alcohol passes via conduit 4 back to zone 1. Part of the alcohol passes to separation zone 17 in this example where the zone is a filter via conduit 16 as a first stage wash. The aniline hydrogen sulfate formed in zone 8 precipitates in alcohol and the resulting slurry from zone 8 passes via conduit 15 to the filter 17 where it is washed first with alcohol from conduit 16 and then by water supplied via conduit 18. This water and alcohol is recycled to zone 1 via conduit 6. Using aniline, the resulting hydrogen sulfate is insoluble in alcohol. However, if the amine adsorbent utilized in the system is one having a dissociation constant greater than that of ammonia, the resulting hydrogen sulfate is soluble in alcohol and the product of zone 8 can be recovered by crystallization or distillation. The choice of the particular separation will depend upon the economics involved and the heat stability of the particular amine hydrogen sulfate at the distillation temperature. When using distillation, subatmospheric pressures are used to advantage since lower temperatures can be employed.

In any case, the amine hydrogen sulfate (aniline hydrogen sulfate of this example) passes to zone 19 via conduit 20 where it is dissolved in water supplied via conduit 21. Potassium chloride is added with the water via conduits 21 and 22 thus forming the aniline hydrogen chloride and potassium sulfate which precipitates. The reaction product passes via conduit 24 to a two-stage filter 23 where the potassium sulfate is separated out and part of the mother liquor is returned to zone 19 via conduit 25. The potassium sulfate is steam washed in the second stage of filter 23 with steam supplied via conduit 26. The potassium sulfate, freed of aniline hydrogen chloride passes via conduit 27 to drier 28 where the product is dried and recovered via conduit 30. The water or steam from the drier is cycled back to conduit 26 via conduit 29. The aniline hydrogen chloride with some water passes from filter 23 via conduit 31 to distillation zone 32 where thermal decomposition regenerates the aniline and releases hydrogen chloride. The hydrogen chloride passes overhead via conduit 39 and can be recovered as muriatic acid. Except under severe conditions, all of the aniline hydrogen chloride will not be decomposed so a final cleanup will generally be required. This can be done by adding limestone (calcium carbonate) to the system and the calcium carbonate will react with the HCl of the aniline hydrogen chloride to form calcium chloride and carbon dioxide. For convenience, we show the aniline hydrogen chloride along with water passing from distillation zone 32 via conduit 33 to reaction zone 34. Calcium carbonate is added via conduit 36 and the water-wet calcium chloride recovered via conduit 37 and sent to waste. The aniline and carbon dioxide in water (carbonic acid) is returned to zone 32 via conduit 35. The carbon dioxide and water passes overhead from distillation zone 32 via vent 38. The analine then passes from zone 32 through cooler 40 via conduit 7 back to the initial reaction zone 1.

In many cases, it is not desirable or commercially feasible to recover HCl and due to air pollution, it is undesirable to vent the HCl to the atmosphere. In such cases, the system described above can be utilized and the HCl treated with limestone to neutralize the acid. However, if we do not wish to recover HCl as a salable product, we prefer the recovery system shown in FIGURE 2. The potassium sulfate filter, drier and separation system are the same as in FIGURE 1 and the various reaction zones and conduits are numbered the same. In this latter case, the aniline hydrogen chloride in water passes from filter 23 via conduit 31 to reaction zone 41 where sufficient calcium carbonate (limestone) is added via conduit 43 to neutralize all of the HCl. This zone 41 is provided with heating means 42 and the temperature is held sufficiently high to cause the water and $CO_2$ to pass overhead via conduit 50. The calcium chloride slurry in aniline then passes to filter 44 via conduit 45 where the wet filter cake is separated from the bulk of the aniline. The aniline is then recycled via conduit 7 to the first reaction zone as in FIGURE 1. The wet filter cake passes via conduit 46 to drier 47 where aniline is driven overhead via conduit 48 and is recycled back to the first reaction zone via conduit 7 along with the aniline from the filter 44. The dried calcium chloride is removed via conduit 49.

This invention has been described in a particular preferred embodiment. It is within the skill of the art to use centrifuges, drum filters and the like to separate solids from liquids and to provide particular types of reactors and/or separators for the operation being performed. It is also within the skill of the art to provide valves, pumps and the like as needed, this being no part of the invention.

Having thus described the invention, we claim:

1. A method for producing potassium sulfate from potassium chloride and sulfur dioxide, said method comprising in combination:
    (a) Reacting an amine base in an alcohol solvent with sulfur dioxide and water to form a solution of the amine hydrogen sulfite;
    (b) Contacting said amine hydrogen sulfite with an oxygen containing gas to produce the corresponding amine hydrogen sulfate;
    (c) Separating the amine hydrogen sulfate from the alcohol and recycling the alcohol to step (a);
    (d) Dissolving the amine hydrogen sulfate in water;
    (e) Reacting the resulting solution from (d) with potassium chloride to form a solution of amine hydrogen chloride and a precipitate of potassium sulfate;
    (f) Separating the precipitate product potassium sulfate from the amine hydrogen chloride;
    (g) Breaking the amine hydrogen chloride down to recover the amine and
    (h) Recycling the amine to step (a).

2. The method of claim 1 wherein the amine base is weaker than ammonia.

3. The method of claim 2 wherein the amine base is selected from the group consisting of aromatic amines and heterocyclic nitrogen containing compounds.

4. The method of claim 3 wherein the amine hydrogen sulfate is separated from the alcohol by filtration.

5. The method of claim 4 wherein the alcohol is a primary aliphatic 1-OL of 1 to 6 carbon atoms.

6. The method of claim 5 wherein the amine hydrogen chloride is broken by thermal decomposition.

7. The method of claim 5 wherein the amine hydrogen chloride is broken by reacting same with calcium carbonate.

8. The method of claim 5 wherein the amine hydrogen chloride is broken by a combination of thermal decomposition and reaction with calcium carbonate.

References Cited

UNITED STATES PATENTS

| 2,106,446 | 1/1938 | Baehr et al. | 32—2 |
| 2,122,544 | 7/1938 | Von Girsewald et al. | 23—2 X |
| 2,128,027 | 8/1938 | Clark | 23—2 X |
| 2,395,509 | 2/1946 | Shaw | 23—2 |
| 2,445,468 | 7/1948 | Blohm et al. | 23—2 |
| 2,906,603 | 9/1959 | Lafont | 23—121 |
| 3,022,348 | 2/1962 | Rubin | 23—121 X |

FOREIGN PATENTS

| 506,002 | 5/1939 | Great Britain. |

OSCAR R. VERTIZ, *Primary Examiner.*

G. PETERS, *Assistant Examiner.*